United States Patent [19]

Fry et al.

[11] Patent Number: 4,966,947
[45] Date of Patent: Oct. 30, 1990

[54] MODIFIED CHLORINATED POLYOLEFINS

[75] Inventors: Slaton E. Fry; David W. Magouyrk; Allen J. Blankenship, all of Batesville, Ak.; Paul J. Greene; Larry K. Johnson, both of Kingsport, Tenn.

[73] Assignee: Eastman Kodak Company, Rochester, N.Y.

[21] Appl. No.: 196,659

[22] Filed: May 20, 1988

[51] Int. Cl.$^5$ ................................................ C08F 8/32
[52] U.S. Cl. .............................. 525/327.6; 525/282; 525/329.6; 525/380
[58] Field of Search .................... 525/380, 327.6, 329.6

[56] References Cited

U.S. PATENT DOCUMENTS

| | | | |
|---|---|---|---|
| 3,412,078 | 11/1968 | Hagemeyer, Jr. et al. | 260/93.7 |
| 3,444,170 | 5/1969 | Norman et al. | 260/268 |
| 3,579,485 | 5/1971 | Folzenlogen et al. | 260/78.4 D |
| 3,585,172 | 6/1971 | Nishiyama et al. | 260/78.5 |
| 3,919,143 | 11/1975 | Morris | 525/340 |
| 4,152,276 | 5/1979 | Jackisch | 525/380 |
| 4,303,697 | 12/1981 | Baseden | 428/520 |
| 4,317,265 | 3/1982 | Chase et al. | 525/380 |
| 4,666,620 | 5/1987 | Forslberg | 252/75 |
| 4,731,419 | 3/1988 | Fong | 525/380 |

FOREIGN PATENT DOCUMENTS 61889  10/1982  European Pat. Off. .

*Primary Examiner*—Bernard Lipman
*Attorney, Agent, or Firm*—S. E. Reiter; William P. Heath, Jr.

[57] ABSTRACT

Chemically-modified, chlorinated, hydroxyimidized polyolefins having improved properties of solvent and/or humidity resistance and method for preparation thereof are disclosed. The novel materials prepared in accordance with the present invention are useful, for example, as primers for use with polymeric substrates.

7 Claims, No Drawings

MODIFIED CHLORINATED POLYOLEFINS

This invention relates to modified chlorinated polyolefins and processes for the preparation and use thereof.

BACKGROUND OF THE INVENTION

Chlorinated, carboxyl group-containing polyolefins are useful, for example, as primers or as coatings for a variety of substrates, such as for example, polyolefin substrates. While such materials may have good properties of toughness, flexibility and chemical resistance when used in coating applications, the adhesion of such coatings to the desired substrate is frequently poor, and consequently conditions such as solvent contact, high humidity and the like cause release of the coating from the substrate. It would, therefore, be an advance in the art to provide modified chlorinated polyolefins capable of forming primers or coatings which have good adhesion to substrates, and which, in addition, have good heat stability, toughness, flexibility and chemical resistance.

STATEMENT OF THE INVENTION

In accordance with the present invention, we have discovered that chlorinated, carboxyl-containing polyolefins can be modified to produce polymers having greatly improved adhesion to substrates, even when exposed to a variety of solvents and/or high humidity conditions.

DETAILED DESCRIPTION OF THE INVENTION

In accordance with the present invention, there is provided a method for the preparation of polycarboxylated, chlorinated polyolefins having improved properties of solvent and/or humidity resistance, said method comprising contacting a polycarboxylated, chlorinated polyolefin having in the range of about 10 up to 40 weight percent chlorine and an acid number (expressed in terms of mg KOH/g of polymer) in the range of about 10 up to 75 with at least a stoichiometric amount (relative to the acid number of the polycarboxylated, chlorinated polyolefin) of at least one hydroxyamine having the structural formula:

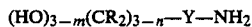

$$(HO)_{3-m}(CR_2)_{3-n}-Y-NH_2$$

wherein m=0, 1 or 2; n=0, 1, 2 or 3; R is H or a hydrocarbyl radical having in the range of 1 up to 20 carbon atoms; and Y is a hydrocarbyl moiety, e.g., an alkylene or arylene moiety, having in the range of 1 up to 20 carbon atoms, under conditions suitable to form a hydroxyimidized, chlorinated polyolefin.

The carboxyl group containing polyolefin can be prepared, for example, by reacting low viscosity amorphous and crystalline polyolefins prepared, for example, from olefins containing at least 2 carbon atoms with an unsaturated polycarboxylic acid, anhydrides or esters thereof, preferably in the presence of free radicals.

Suitable polyolefins employed in the practice of the present invention are polymers prepared from one or more olefins having in the range of 2 up to 10 carbon atoms, and a number average molecular weight (as determined by gel permeation chromatography relative to polystyrene standards) in the range of about 2,000 up to 40,000. Preferred polyolefins have a number average molecular weight in the range of about 4,000 up to 20,000, with polyolefins having a number average molecular weight in the range of about 4,000 up to 12,000 being most preferred.

Preferred olefins from which are prepared the polyolefins employed in the practice of the invention are selected from the group consisting of:
ethylene
propylene,
1-butene,
cis-2-butene,
trans-2-butene,
isobutylene,
1-pentene,
1-hexene,
1-octene,
and the like, as well as mixtures of any two or more thereof. Polymers or copolymers prepared primarily from ethylene and/or propylene are presently the most preferred polyolefins for use in the practice of the present invention.

One suitable homopolymeric or copolymeric low viscosity polyolefin can be prepared by thermally degrading conventional high molecular weight polyolefin prepared by conventional polymerization processes. These polyolefins are, for example, high, medium and low density polyethylene, crystalline polypropylene, amorphous polypropylene, polybutene-1, polypentene-1, ethylene/propylene copolymers and the like. For example, one suitable conventional polymer is the polypropylene prepared according to U.S. Pat. No. 3,412,078.

Thermal degradation of the conventional homopolymers or copolymers is accomplished by heating at elevated temperatures causing the polymer chain to rupture apparently at the points of chain branching of the polymeric material. The degree of degradation is controlled by reaction time and temperature to give a thermally degraded low molecular weight polymeric material having a melt viscosity range from about 100–5,000 cp. at 190° C. (ASTM-D1238-57T using 0.04±0.0002 inch orifice) and an inherent viscosity of about 0.1 to 0.5, measured in Tetralin at 145° C. By carefully controlling the time, temperature and agitation, a thermally degraded polyolefin of relatively narrower molecular weight range than the starting high molecular weight polymer can be obtained. The degradation is carried out at a temperature in the range of about 290° C. to about 425° C. These low viscosity polyolefins prepared by thermally degrading conventional high molecular weight polymers are not emulsifiable as such; but upon reaction with unsaturated polycarboxylic acids, anhydrides, or esters thereof, the acid number and saponification number are increased to a number greater than 15 to provide an emulsifiable material. If the acid number and the saponification number of polyolefins prepared in this manner are less than 15, the material is generally not emulsifiable.

Another suitable low viscosity polyolefin is prepared by polymerizing a suitable olefin to a melt viscosity of from about 100 to 5,000 cp as measured at 190° C. (ASTM-D1238-57T using 0.04±0.002 inch orifice).

Those of skill in the art are aware of numerous other methods which can be employed to prepare suitable low viscosity polyolefins for use in the practice of the present invention.

The low viscosity polyolefins are reacted with unsaturated polycarboxylic acids, anhydrides or esters thereof at temperatures generally less than about 350° C., preferably from about 150°–300° C. in the presence of a free radical source which can be used as a catalyst. By using a free radical source, the temperature of reaction is reduced.

Suitable free radical sources are, for example, peroxides such as ditertiarybutyl peroxide, tertiary-butyl hydroperoxide, cumene hydroperoxide, or azo compounds, such as azobis(isobutyronitrile), or irradiation sources. Suitable irradiation sources include, for example, those from cobalt, uranium, thorium, and the like and ultraviolet light.

Those of skill in the art can readily determine suitable amounts of organic unsaturated polycarboxylic acid, ester or anhydride thereof to employ in order to achieve product having the desired acid number. Broadly, in the range of about 0.5% up to 15% by weight, based on the weight of low viscosity polyolefin, can be used in the practice of the present invention. Preferably, about 1% to 10% organic unsaturated polycarboxylic acid, anhydride or esters thereof, based on the weight of the low viscosity polyolefin will be used in the practice of the present invention.

The amount of peroxide or free radical agent used is generally quite low being of the order of about 0.01% to about 0.5% based on the weight of the low viscosity polyolefin.

The reaction can be carried out either in a batchwise or in a continuous manner with contact times in the order of about 10 minutes to about 2 hours.

Suitable unsaturated polycarboxylic acids and anhydrides are, for example, maleic acid, maleic anhydride, fumaric acid, citraconic anhydride, aconitic anhydride and itaconic anhydride. Suitable esters are, for example, the half or full esters derived from methyl, ethyl, dimethyl maleate, dimethyl fumarate, methyl ethyl maleate, dibutyl maleate, dipropyl maleate, and the like, or those compounds which form these compounds at elevated reaction temperatures such as citric acid, for example.

These acid modified low molecular weight polyolefin compositions have a melt viscosity of 100–5,000 centipoise at 190° C. and an acid number in the range of about 10 up to 75, preferably in the range of about 20–50. It has been observed in the practice of the present invention that the melt viscosity of the product increases slightly upon modification of the polyolefin with the polycarboxylic moiety. This increase in melt viscosity may be due to a slight degree of crosslinking or to copolymerization of the wax material with the polycarboxylic moiety.

One method for the determination of the acid number is as follows: Weight approximately one gram of the sample into a 250-mL alkali-resistant Erlenmeyer flask and add 50 mL distilled xylene, 25 mL isopropyl alcohol and 2 mL deionized water. Titrate potentiometrically with standardized 0.10N KOH in ethyl alcohol.

Calculation:

$$\frac{\text{mL KOH} \times \text{NKOH} \times 56.1}{\text{g Sample}} = \text{Acid Number}$$

The unreacted unsaturated polycarboxylic acid can be separated from the reaction mixture by purging the reaction mixture with an inert gas while the melt temperature is between 200° and 300° C. After the unreacted unsaturated polycarboxylic acid has been removed, the modified polyolefin can be further purified by standard techniques, such as for example, vacuum stripping, solvent extraction, or dissolving in an aqueous medium and isolating by removing the solvent or water.

The chlorination procedure is conveniently carried out in solution and may be carried out either batchwise or continuously. The solvent used should be one which is inert to elemental chlorine and to hydrogen chloride, which is the principal by-product of the reaction. Suitable solvents include halogenated aromatics and halogenated aliphatics, such as, for example, chlorobenzene and carbon tetrachloride. The solvent employed is preferably of a high degree of purity and contain very low amounts, less than about 100 ppm, of components which yield ash on burning. The solvent employed is also preferably colorless and low boiling for easy removal from the polymer product. It is noted that the ash content of the chlorinated, polyolefin product is preferably less than about 0.01% by weight of the polymer.

The concentration of carboxyl group containing polyolefin in the chlorination solvent may be varied, but will generally not exceed about 50% by weight, with the preferred range being in the range of about 25% up to 35% by weight. Concentrations greater than about 50% provide solutions of high viscosity which are difficult to agitate adequately.

The chlorination temperature may also be varied, but at about 160° C. the chlorinated polymer becomes susceptible to degradation. At a chlorination temperature of <50° C. the reaction is extremely slow. Generally the preferred temperature range for the chlorination is from about 50° to about 120° C. In some instances it is desirable that the reaction be carried out under a moderate chlorine pressure in order to increase the solubility of the chlorine in the liquid phase. Generally, the reaction is carried out merely by adding chlorine gas into a well-stirred solution of the polyolefin dissolved in a suitable solvent.

The progress of the chlorination reaction can be followed in a number of ways. One method for such determination is to periodically isolate a sample of the chlorinated polyolefin and determine the density of this polymer. The chlorine content is directly related to density and can be determined from a graph showing the amount of chlorine versus the increase in viscosity. Alternative ways to determine the degree of chlorination is to (1) determine the viscosity of the reaction mixture, or (2) measure the quantity of hydrogen chloride liberated in the course of the reaction. The presently preferred method of determining the degree of chlorination is to remove the solvent from an aliquot of sample, then subjecting the sample to Schoniger combustion and measuring the total HCl released by potentiometric titration with standardized silver nitrate solution.

When the desired chlorine content is reached, the polymeric product may be isolated by any of a number of methods well known in the art. The reaction solvent may be removed, for example, by stripping with a hot gas or by vacuum distillation.

The chlorinated, carboxyl group-containing polyolefin is chlorinated until the desired chlorine content is obtained. The chlorinated carboxyl group containing polyolefin for primer use should have a chlorine content of from about 10 to about 40 weight percent, preferably about 15 to 32, and, most preferably, about 20 up to 24 weight percent. These chlorinated polymers find particular use as primers for polyolefin surfaces. Chlorinated carboxyl containing polyolefins containing less than 10 weight percent chlorine have solubilities so low as to be undesirable for use as a primer. If the chlorine content is greater than about 32 weight percent, the polymer is very soluble and tends to cause the primer coating to redissolve on coating with a top coat. The most preferred chlorine content of about 20-24 weight percent provides a chlorinated polymer having not only good solubility, but also forms primer coatings which do not redissolve when a top coat is applied to the primed surface.

In addition to the chlorinated polyolefins, the primer coating solutions can have incorporated therein typical additives such as stabilizers, fillers, pigments, plasticizers, resinous modifiers, solvents, and the like.

In accordance with the present invention, the chlorinated, carboxyl group containing polyolefins prepared as described above are contacted with at least one hydroxyamine having the structural formula:

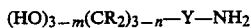

wherein m=0, 1 or 2; n=0, 1, 2 or 3; R is H or a hydrocarbyl radical having in the range of 1 up to 20 carbon atoms; and Y is a hydrocarbyl moiety, e.g., an alkylene or arylene moiety, having in the range of 1 up to 20 carbon atoms, under conditions suitable to form a hydroxyimidized, chlorinated polyolefin.

Hydroxyamine compounds contemplated for use in the practice of the present invention include:
tris(hydroxymethyl)methyl amine,
para-aminophenol,
2-amino-2-methyl-1-propanol,
3-amino-1-propanol
ethanolamine,
2,2-dimethyl-3-amino-1-propanol,
and the like, as well as mixtures of any two or more thereof.

Contacting of the chlorinated, carboxyl group-containing polyolefin compounds with hydroxyamine compounds can be carried out under a variety of conditions. Typically, temperatures in the range of about 50° up to about 150° C. for contact times in the range of about 0.1 up to 6 hours are suitable to obtain substantially complete conversion of the carboxyl groups of the polymer chain to hydroxyimide moieties.

The resulting hydroxyimidized, chlorinated polyolefins comprise a polyolefin of at least one olefin selected from the group consisting of $C_2$ up to $C_{10}$ olefins; wherein said polyolefin contains in the range of about 10 up to 40 weight % chlorine; wherein said polyolefin further contains in the range of about 10 up to 30 hydroxyimide moieties per polymer chain; wherein said hydroxyimide has the structural formula:

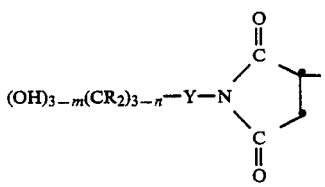

wherein m=0, 1 or 2; n=0, 1, 2 or 3; R is H or a hydrocarbyl radical having in the range of 1 up to 20 carbon atoms; and Y is a hydrocarbyl moiety having in the range of 1 up to 20 carbon atoms. Preferred hydroxy amines from which these hydroxyimides are derived are tris(hydroxymethyl)methyl amine,
para-aminophenol,
2-amino-2-methyl-1-propanol,
3-amino-1-propanol,
ethanolamine,
2,2-dimethyl-3-amino-1-propanol,
as well as mixtures of any two or more thereof.

The modified, chlorinated polyolefins of the present invention can also be described by reference to the following repeating units:

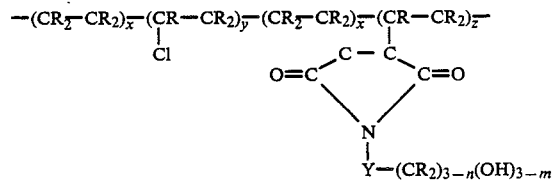

wherein m=0, 1 or 2; n=0, 1, 2 or 3; R is H or a hydrocarbyl radical having in the range of 1 up to 20 carbon atoms; and Y is a hydrocarbyl moiety having in the range of 1 up to 20 carbon atoms; wherein each of x, y, and z can vary in the range of about 0 up to 1,000 so that the resulting polymer has a number average molecular weight in the range of about 2,000 up to 40,000, and wherein the ratio of x:y can vary from about 1:1 up to about 4:1, the ratio of x:z can vary from about 20:1 up to about 50:1, and the ratio of y:z can vary from about 10:1 up to about 20:1. Preferred structures include those where the moiety $$>N-Y-(CR_2)_{3-n}(OH)_{3-m}$$

is selected from the group consisting of:

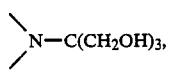

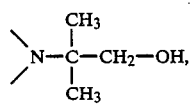

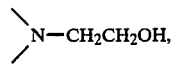

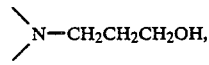

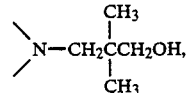

as well as mixtures of any two or more thereof.

In accordance with another embodiment of the present invention, there is provided a method for improving the adhesion, solvent and/or humidity resistance of topcoats when applied to a substrate, said method comprising applying the desired topcoat to said surface which has been treated with a hydroxyimidized, chlorinated polyolefin composition having the structure:

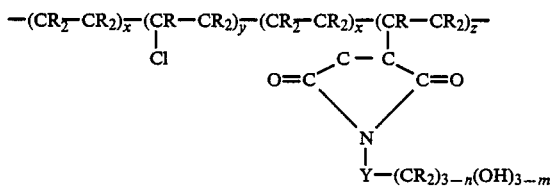

wherein m=0, 1 or 2; n=0, 1, 2 or 3; R is H or a hydrocarbyl radical having in the range of 1 up to 20 carbon atoms; and Y is a hydrocarbyl moiety having in the range of 1 up to 20 carbon atoms; wherein each of x, y, and z can vary in the range of about 0 up to 1,000 so that the resulting polymer has a number average molecular weight in the range of about 2,000 up to 40,000, and wherein the ratio of x:y can vary from about 1:1 up to about 4:1, the ratio of x:z can vary from about 20:1 up to about 50:1, and the ratio of y:z can vary from about 10:1 up to about 20:1.

For use as a primer, the chlorinated, carboxyl group-containing polyolefin is preferably applied as a solution. The preferred solvents for forming these solutions are aromatic solvents, such as toluene and xylene. The primer solutions contain in the range of about 1% up to 10%, by weight, preferably about 5%, chlorinated, hydroxyimidized polyolefin. Solutions containing more than 10% are more difficult to spray to a desired film thickness, while solutions containing less than 1% do not contain sufficient chlorinated material to adequately prime the surface onto which it is applied. Solutions containing about 5% are most preferred since this solution can be easily sprayed onto a surface and contains adequate chlorinated material to prime the surface onto which it is applied.

It should also be noted that the primer can be added to conventional paint formulations so that the adhesion of the paint to the surface to be painted is enhanced.

The chlorinated, carboxyl-containing polyolefins can be used as primers or coatings on various types of substrates. Such substrates include polyolefins such as polyethylene and polypropylene, and also metal surfaces such as copper wire, aluminum foil, steel, galvanized metal, and the like. These primers prepare the surface for conventional lacquer or enamel coatings. These primers also prepare such surfaces for printing with conventional printing operations. Thus, for example, these chlorinated, carboxyl group-containing polyolefins provide primers for preparing polyethylene surfaces onto which can be printed a design by conventional printing processes. This reduces or eliminates the necessity to prepare the surface of a polyolefin article for printing by such methods as treating with flame or corona discharge.

This invention can be further illustrated by the following examples of preferred embodiments thereof, although it will be understood that these examples are included merely for purposes of illustration and are not intended to limit the scope of the invention.

EXAMPLES

Adhesion, gasoline/solvent resistance, and humidity resistance as set forth in the examples where determined as follows:

ADHESION

Original retained adhesion (Table I) and retained adhesion after 100% humidity exposure (Table IV) was performed by ASTM Method D 3359 using Permacel No. 99 Tape.

GASOLINE/SOLVENT RESISTANCE

VM&P Naphtha/Toluene (50/50 blend by weight) and unleaded gasoline were the two test solutions used to test solvent resistance (Tables II and III). An "X" cut was made through the primer/paint coating to the polypropylene plaque prior to immersion of the specimen in gasoline/solvent. Minutes to lifting of the topcoat was recorded with the first visual beginning of separation "lift" of paint to polypropylene plaque.

HUMIDITY RESISTANCE

The primed/painted specimens were stored in a 100% humidity cabinet for 100 hours at 100° F. Immediately after removal of the specimens from the humidity cabinet, they were wiped dry and retained adhesion was determined by ASTM 3359.

EXAMPLE 1

Preparation of Hydroxyimidized, Chlorinated Polyolefins

Two hundred grams of a 25% xylene solution of a chlorinated polyolefin with 20% chlorine, an acid number of 23 and a number average molecular weight in the range of about 4,000–8,000 (Eastman's Chlorinated Polyolefin CP-343-1) was charged to a 500-mL flask and heated to 100° C. A hydroxyamine such as tris(hydroxymethyl)methyl amine (2.15 g) was then added and the temperature was maintained at 100° C. for one hour. The batch was then cooled to room temperature and the batch was diluted to 5% solids by adding 800 g of toluene. Untreated polypropylene plaques (Tenite 4240G) were then primed at two different film thicknesses and adhesion, humidity and solvent resistance tests were conducted.

The imidized, chlorinated polyolefins were spray applied as 5% solids primers on polypropylene plaques, which had been previously wiped clean with methyl ethyl ketone solvent. Approximately 30 minutes after priming, the following automotive topcoats were spray applied: acrylic lacquer (Du Pont Lucite acrylic lacquer; automotive, air dry refinish type), acrylic enamel (Du Pont Centari acrylic enamel; automotive, air dry refinish type), and OEM (PPG Durethane 700 OEM, bake type—30 minutes at 250° F.). The primed/painted plaques were allowed to cure/condition for 30 days at approximately 75° F. prior to testing for adhesion, gasoline/solvent resistance, and humidity resistance.

A range of tests, as summarized in the examples which follows, where conducted on the coated polypropylene plaques prepared as described above.

EXAMPLE 2

Retained Original Adhesion for Modified and Unmodified Chlorinated Polyolefins A number of polypropylene plaques were coated with comparison (unmodified) chlorinated polyolefins as well as chlorinated polyolefins prepared in accordance with the present invention. The resulting coated plaques were then tested to determine the degree to which the original adhesion was retained after application of a variety of topcoats.

The results are summarized in Table I.

TABLE I

Adhesion of Hydroxyimidized, Chlorinated Polyolefins With a Variety of Topcoats Compared to Unmodified Chlorinated Polyolefin at a Dry Film Primer Thickness of 0.10 and 0.30 mil

| | Topcoats (% Retained Cross-Hatch Adhesion; for 0.10/0.30 mil Thickness) | | | |
|---|---|---|---|---|
| Modifier | Primer Only | Acrylic Lacquer | Acrylic Enamel | OEM Urethane |
| None (CP 343-1) | 100/100 | 100/100 | 100/100 | 100/95 |
| Tris(hydroxymethyl)-methylamine | 100/100 | 0/0 | 100/100 | 90/100 |
| p-Aminophenol | 100/100 | 100/100 | 100/100 | 100/100 |
| Ethanolamine | 100/100 | 0/0 | 100/100 | 100/100 |
| 2-Amino-2-methyl-1-propanol | 100/100 | 0/0 | 100/100 | 100/100 |

These results show that there is no compromise in the degree of original adhesion retention when hydroxyamine-treated, chlorinated polyolefins of the invention are used as primer coatings with selected topcoats.

EXAMPLE 3

Solvent Resistance of Modified and Unmodified Chlorinated Polyolefins

A number of polypropylene plaques were coated with comparison (unmodified) chlorinated polyolefins as well as chlorinated polyolefins prepared in accordance with the present invention. The resulting coated plaques were then tested to determine how well the primer-treated plaques resisted lifting of the topcoat when subjected to a naphtha/toluene solvent system.

The results are summarized in Table II.

TABLE II

Resistance to Lifting of Topcoat While Using Hydroxyimidized Chlorinated Polyolefins as Primers in VM&P Naphtha/Toluene Versus Unmodified Chlorinated Polyolefin at a Dry Film Primer Thickness of 0.1 and 0.3 mil

| | Topcoat (Minutes to Lifting for 0.1/0.3 mil Thickness) | | |
|---|---|---|---|
| Modifier | Acrylic Lacquer | Acrylic Enamel | OEM Urethane |
| None (CP 343-1) | 22/19 | 2.0/2.0 | 0.75/1.0 |
| p-Aminophenol | 30/26 | 2.7/4.0 | 1.5/3.0 |
| Tris(hydroxymethyl) methylamine | NT/NT | 3.0/5.5 | 1.0/1.5 |
| Ethanolamine | NT/NT | 2.5/4.0 | 1.0/2.0 |
| 2-Amino-2-methyl 1-propanol | NT/NT | 3.0/5.0 | 1.0/2.5 |

NT = not tested - no initial adhesion.

These results demonstrate that hydroxyamine-treated, chlorinated polyolefins of the invention are substantially more resistant to solvent than is unmodified chlorinated polyolefin with selected topcoats.

EXAMPLE 4

Gasoline Resistance of Modified and Unmodified Chlorinated Polyolefins

A number of polypropylene plaques were coated with comparison (unmodified) chlorinated polyolefins as well as chlorinated polyolefins prepared in accordance with the present invention. The resulting coated plaques were then tested to determine how well the primer-treated plaques resisted lifting of the topcoat when subjected to unleaded gasoline.

The results are summarized in Table III.

TABLE III

Resistance to Lifting of Topcoat While Using Hydroxyimidized Chlorinated Polyolefins as Primers in Unleaded Gasoline Versus Unmodified Chlorinated Polyolefin at a Dry Film Primer Thickness of 0.1 and 0.3 mil

| | Topcoat (Minutes to Lifting for 0.1/0.3 mil Thickness) | | |
|---|---|---|---|
| Modifier | Acrylic Lacquer | Acrylic Enamel | OEM Urethane |
| None (CP 343-1) | 30/30 | 14/14 | 2.0/4.0 |
| p-Aminophenol | 30/30 | 30/19 | 7.0/13 |
| Tris(hydroxymethyl) methylamine | NT/NT | 21/30 | 3.0/6.0 |
| Ethanolamine | NT/NT | 22/19 | 4.5/13 |
| 2-Amino-2-methyl 1-propanol | NT/NT | 22/19 | 6.0/8.0 |

NT = not tested - no initial adhesion

These results demonstrate that hydroxyamine-treated, chlorinated polyolefins of the invention are substantially more resistant to gasoline exposure than is unmodified chlorinated polyolefins with selected topcoats.

EXAMPLE 5

Humidity Resistance of Modified and Unmodified Chlorinated Polyolefins

A number of polypropylene plaques were coated with comparison (unmodified) chlorinated polyolefins as well as chlorinated polyolefins prepared in accordance with the present invention. The resulting coated plaques were then tested to determine how well the primer-treated plaques maintained adhesion of the coating when subjected to long-term exposure to high humidity levels.

The results are summarized in Table IV.

TABLE IV

Retained Adhesion of Topcoats on Polypropylene Primed With Hydroxyimidized Chlorinated Olefins After Exposure to 100% Humidity Versus Unmodified Chlorinated Polyolefin at a Dry Film Primer Thickness of 0.1 and 0.3 mil

| | Topcoat (% Retained Cross Hatch Adhesion at 0.1/0.3 mil Thickness) | | |
|---|---|---|---|
| Modifier | Acrylic Lacquer | Acrylic Enamel | OEM Urethane |
| None (CP 343-1) | 90/95 | 85/90 | 75/80 |
| p-Aminophenol | 95/100 | 90/98 | 10/99 |
| Tris(hydroxymethyl) methylamine | NT/NT | 98/98 | 90/80 |
| Ethanolamine | NT/NT | 90/90 | 75/95 |
| 2-Amino-2-methyl 1-propanol | NT/NT | 96/97 | 95/95 |

NT = Not tested - no initial adhesion

These results demonstrate that hydroxyamine-treated, chlorinated polyolefins of the invention are more resistant to long-term exposure to high humidity levels than is unmodified chlorinated polyolefins with selected topcoats.

The invention has been described in detail with particular reference to preferred embodiments thereof, but it will be understood that variations and modifications can be effected within the spirit and scope of the invention.

That which is claimed is:

1. A method for the preparation of polycarboxylated, chlorinated polyolefins having improved properties of solvent and/or humidity resistance, said method comprising contacting a polycarboxylated, chlorinated polyolefin having in the range of about 10 up to 40 weight percent chlorine and an acid number (expressed in terms of mg KOH/g of polymer) in the range of about 10 up to 75 with at least a stoichiometric amount (relative to the acid number of the polycarboxylated, chlorinated polyolefin) of at least one hydroxyamine having the structural formula:

$$(HO)_{3-m}(CR_2)_{3-n}-Y-NH_2$$

wherein m=0, 1 or 2; n=0, 1, 2 or 3; R is H or a hydrocarbyl radical having in the range of 1 up to 20 carbon atoms; and Y is a hydrocarbyl moiety having in the range of 1 up to 20 carbon atoms, under conditions suitable to form a hydroxyimidized, chlorinated polyolefin.

2. The method of claim 1 wherein said hydroxyamine is selected from the group consisting of:
tris(hydroxymethyl)methyl amine,
para-aminophenol,
2-amino-2-methyl-1-propanol,
3-amino-1-propanol,
ethanolamine,
2,2-dimethyl-3-amino-1-propanol,
as well as mixtures of any two or more thereof.

3. The method of claim 1 wherein said contacting is carried out at a temperature in the range of about 50 up to 150 degrees C for a time in the range of about 0.1 up to 6 hours.

4. The method of claim 1 wherein said polycarboxylated, chlorinated polyolefin is a polymer having a number average molecular weight in the range of about 2,000 up to 40,000 and prepared from one or more olefins having 2 up to 10 carbon atoms.

5. The method of claim 4 wherein said one or more olefins are selected from the group consisting of:
ethylene,
propylene,
1-butene,
cis-2-butene,
trans-2-butene,
isobutylene,
1-pentene,
1-hexene,
1-octene,
as well as mixtures of any two or more thereof.

6. The method of claim 1 wherein said polycarboxylated, chlorinated polyolefin is polypropylene having a number average molecular weight in the range of about 4,000 up to 20,000, wherein said chlorine content falls in the range of about 20 up to 24 weight percent, and the acid number falls in the range of about 20 up to 25 mg KOH/g sample.

7. The polymer produced by the method of claim 1.

* * * * *